US009053245B2

(12) United States Patent
Kumar KN et al.

(10) Patent No.: US 9,053,245 B2
(45) Date of Patent: Jun. 9, 2015

(54) PARTIAL REDUNDANCY FOR I/O MODULES OR CHANNELS IN DISTRIBUTED CONTROL SYSTEMS

(71) Applicant: Honeywell International, Inc., Morristown, NJ (US)

(72) Inventors: Dinesh Kumar KN, Bangalore (IN); Paul Gerhart, North Wales, PA (US); Sai Krishnan Jagannathan, Banglaore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 198 days.

(21) Appl. No.: 13/767,661

(22) Filed: Feb. 14, 2013

(65) Prior Publication Data

US 2014/0229772 A1 Aug. 14, 2014

(51) Int. Cl.
*G06F 11/00* (2006.01)
*G06F 13/40* (2006.01)

(52) U.S. Cl.
CPC .......... *G06F 13/4022* (2013.01); *G06F 11/006* (2013.01)

(58) Field of Classification Search
CPC .................................................. G06F 11/2002
See application file for complete search history.

(56) References Cited

U.S. PATENT DOCUMENTS

| 4,527,271 | A | * | 7/1985 | Hallee et al. ..................... 700/79 |
| 5,125,102 | A | * | 6/1992 | Childress et al. ................. 455/9 |
| 5,966,301 | A | | 10/1999 | Cook et al. |
| 5,997,166 | A | | 12/1999 | Flood |
| 7,233,568 | B2 | * | 6/2007 | Goodman et al. ............ 370/218 |
| 7,321,981 | B1 | | 1/2008 | Muntz |
| 7,487,531 | B1 | * | 2/2009 | Vogel et al. ..................... 725/93 |
| 8,086,898 | B2 | | 12/2011 | Kase |
| 8,359,112 | B2 | | 1/2013 | Kephart et al. |
| 8,549,352 | B2 | | 10/2013 | Kranz et al. |
| 2003/0065974 | A1 | * | 4/2003 | Lam et al. ....................... 714/11 |
| 2006/0233204 | A1 | * | 10/2006 | Pomaranski et al. ......... 370/535 |
| 2007/0220367 | A1 | | 9/2007 | Smith et al. |
| 2009/0058457 | A1 | * | 3/2009 | Goodnow et al. ............... 326/10 |
| 2010/0191869 | A1 | | 7/2010 | Kase |

(Continued)

FOREIGN PATENT DOCUMENTS

WO WO 2011/025511 A1 3/2011

OTHER PUBLICATIONS

International Search Report dated Feb. 25, 2015 in connection with International Application No. PCT/US2014/046697; 3 pages.

(Continued)

*Primary Examiner* — Christopher McCarthy

(57) ABSTRACT

An apparatus includes at least one first input/output (I/O) module having multiple first I/O channels. Each first I/O channel is configured to provide a communication path. The apparatus also includes a second I/O module having multiple second I/O channels. Each second I/O channel is configured to provide a redundant communication path for one of the first I/O channels. The apparatus is configured to provide the redundant communication paths for only a subset of the first I/O channels. The first I/O channels may include critical I/O channels and non-critical I/O channels, and the apparatus may be configured to provide the redundant communication paths for only the critical I/O channels. The apparatus can be configured to provide the redundant communication paths for the first I/O channels of a single first I/O module or multiple first I/O modules.

20 Claims, 2 Drawing Sheets

(56) References Cited

U.S. PATENT DOCUMENTS

| | | |
|---|---|---|
| 2010/0306601 A1 | 12/2010 | Kranz et al. |
| 2011/0276190 A1* | 11/2011 | Lillis et al. .................... 700/293 |
| 2012/0120791 A1 | 5/2012 | Ganesan et al. |
| 2013/0007319 A1 | 1/2013 | Decker |
| 2014/0047139 A1* | 2/2014 | Okita .............................. 710/38 |
| 2014/0097700 A1 | 4/2014 | Law et al. |

OTHER PUBLICATIONS

Written Opinion of International Searching Authority dated Feb. 25, 2015 in connection with International Application No. PCT/US2014/046097; 6 pages.

\* cited by examiner

PARTIAL REDUNDANCY FOR I/O MODULES OR CHANNELS IN DISTRIBUTED CONTROL SYSTEMS

TECHNICAL FIELD

This disclosure is directed generally to control systems. More specifically, this disclosure is directed to partial redundancy for input/output (I/O) modules or channels in distributed control systems.

BACKGROUND

Controllers are widely used in process control applications. A controller is often configured as a vertical rack housed in a central location, such as a control room. A rack may include a central processing unit (CPU), memory devices, power supplies, and interface circuitry for communicating with process sensors, process actuators, or switches. The interface circuitry typically includes multiple I/O modules arranged in a parallel configuration, and the I/O modules may be connected to the CPU via a parallel bus connector. In operation, the sensors send data to the CPU via the I/O modules. In response, the CPU issues commands that are transmitted to the actuators or switches via the I/O modules.

Controllers are typically provided with redundant I/O modules to protect against I/O module failures. In critical processes, 1:1 redundancy is often provided to ensure high availability. Thus, in a critical process, each I/O module is supported by an additional I/O module, which functions as a redundant module. However, this increases the size and cost of the system.

SUMMARY

This disclosure provides partial redundancy for I/O modules or channels in distributed control systems.

In a first embodiment, an apparatus includes at least one first input/output (I/O) module having multiple first I/O channels. Each first I/O channel is configured to provide a communication path. The apparatus also includes a second I/O module having multiple second I/O channels. Each second I/O channel is configured to provide a redundant communication path for one of the first I/O channels. The apparatus is configured to provide the redundant communication paths for only a subset of the first I/O channels.

In a second embodiment, a system includes at least one processing device configured to communicate over multiple communication paths. The system also includes at least one first input/output (I/O) module having multiple first I/O channels. Each first I/O channel is configured to provide one of the communication paths. The system further includes a second I/O module having multiple second I/O channels. Each second I/O channel is configured to provide a redundant communication path for one of the first I/O channels. In addition, the system includes a fault detection circuit configured to detect a fault condition with the at least one first I/O module and/or the first I/O channels. The system is configured to provide the redundant communication paths for only a subset of the first I/O channels.

In a third embodiment, a method includes obtaining at least one first input/output (I/O) module having multiple first I/O channels. Each first I/O channel is configured to provide a communication path. The method also includes creating redundant communication paths using a second I/O module having multiple second I/O channels. Each second I/O channel is configured to provide one of the redundant communication paths for one of the first I/O channels. Redundant communication paths are provided for only a subset of the first I/O channels.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
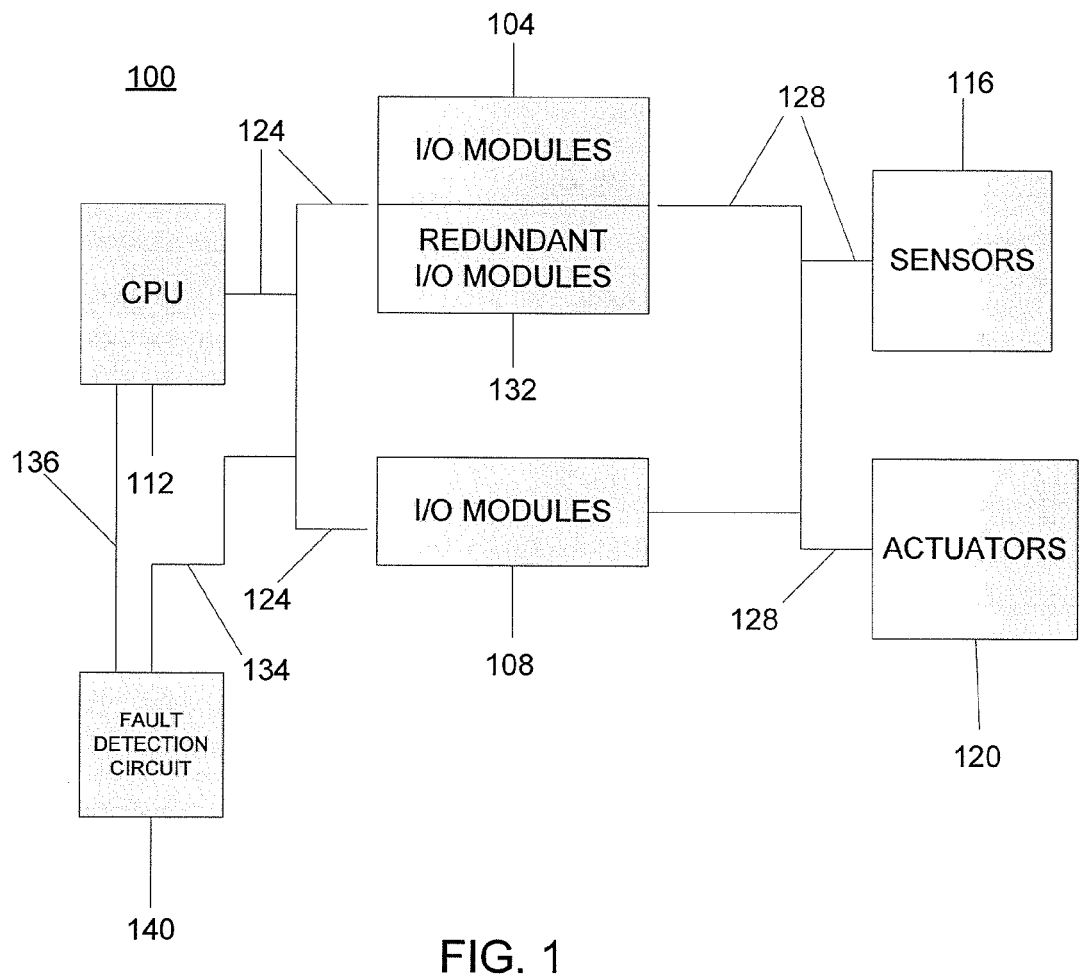
FIGS. 1 and 2 illustrate example process control systems supporting partial redundancy of I/O modules or channels according to this disclosure.
Figure 2:
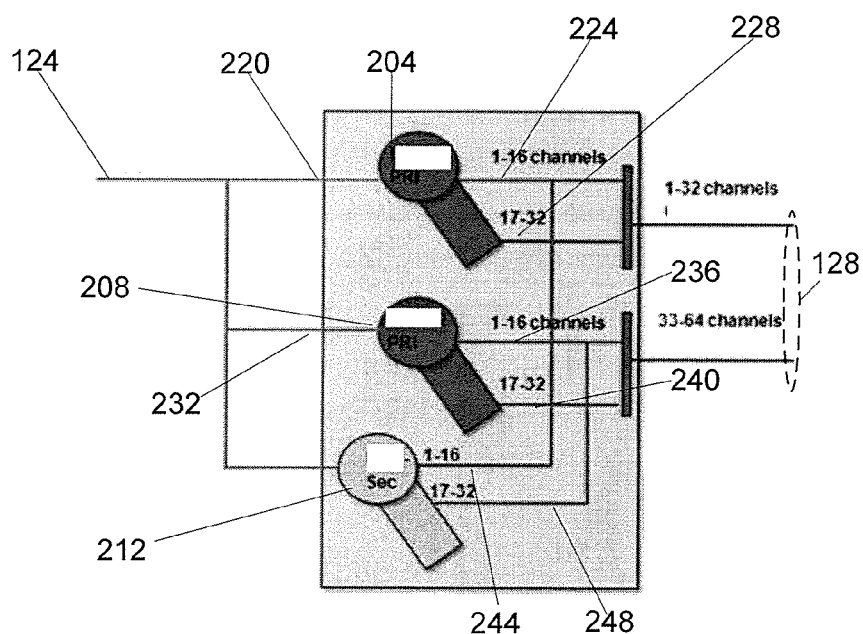
Figure 3:
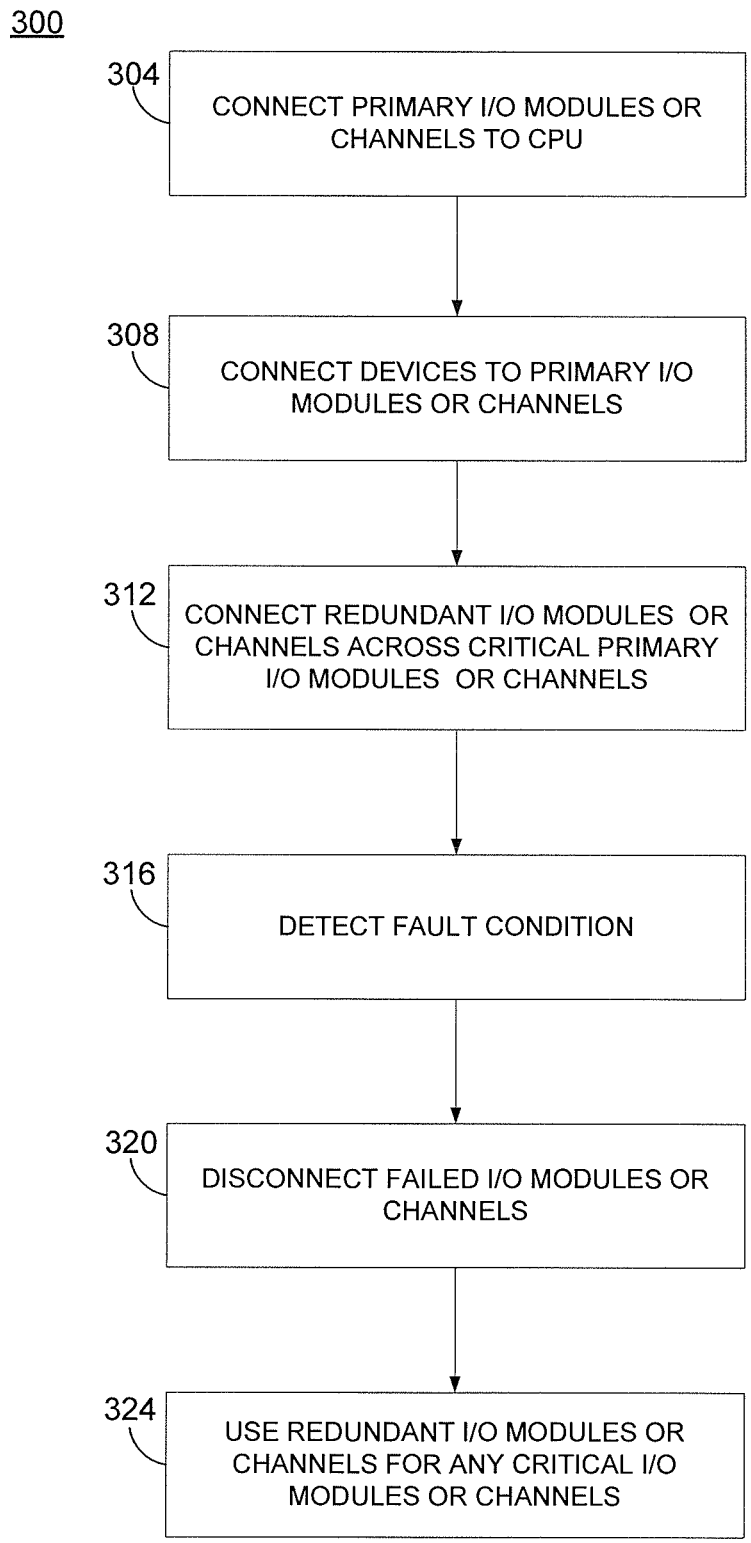
FIG. 3 illustrates an example method for providing partial redundancy of I/O modules or channels according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

In accordance with this disclosure, a distributed control system provides partial redundancy for input/output (I/O) modules or channels that are connected to process sensors, process actuators, switches, or other components. More specifically, the I/O modules or channels dedicated to critical processes (referred to as "critical I/O modules" and "critical I/O channels") are identified. The critical I/O modules or channels are provided with a redundancy (such as 1:1 redundancy) to protect against I/O failures and to ensure high availability. The I/O modules or channels dedicated to non-critical processes (referred to as "non-critical I/O modules" and "non-critical I/O channels") are not provided with a redundancy. Thus, the critical I/O modules or channels are supported by redundant I/O modules or channels while the non-critical I/O modules or channels are not, helping to reduce the size and cost of the digital control system.

FIGS. 1 and 2 illustrate example process control systems supporting partial redundancy of I/O modules or channels according to this disclosure. As shown in FIG. 1, a system 100 generally represents a distributed control system that includes critical I/O modules 104 and non-critical I/O modules 108 connected to a central processing unit (CPU) 112 via at least one parallel bus (or serial) connection 124. The critical I/O modules 104 and non-critical I/O modules 108 are also connected to one or more external components, such as process sensors 116 and actuators 120, via at least one parallel bus (or serial) connection 128. A fault detection circuit 140 is connected to the I/O modules via a connection 134 and to the CPU 112 via a connection 136. In other embodiments, a fault detection circuit may be incorporated into the I/O modules.

Each I/O module 104, 108 includes any suitable structure configured to receive signals from a source and to provide signals to a destination (possibly after converting the signals to a different form). The CPU 112 includes any suitable processing device(s), such as one or more microprocessors, microcontrollers, digital signal processors, field programmable gate arrays, application specific integrated circuits, or other processing device(s), arranged in any suitable configuration. In some embodiments, the CPU 112 executes control logic in order to process measurements from one or more sensors and to generate control signals for one or more actuators. Each sensor 116 includes any suitable structure for sensing one or more conditions. Each actuator 120 includes any suitable structure for performing one or more actions to modify an operation of a system being controlled. The fault detection circuit 140 includes any suitable structure for identifying a fault with at least one I/O module.

In one aspect of operation, the sensors 116 send data to the CPU 112 via the I/O modules 104, 108. In response, the CPU 112 issues commands that are transmitted to the actuators 120 via the I/O modules 104, 108. If any of the I/O modules 104, 108 fail, this can prevent sensor measurements from being received by the CPU 112 from the sensors 116 and/or control signals from being received by the actuators 120 from the CPU 112. This could potentially interrupt control of an underlying industrial process.

According to this disclosure, redundant I/O modules 132 are provided for critical I/O modules 104. For example, the redundant I/O modules 132 can be coupled to the communication bus connections 124, 128 in parallel with the critical I/O modules 104. Depending on the implementation, the redundant I/O modules 132 could provide 1:n redundancy for the critical I/O modules 104, where each critical I/O module 104 has n redundant I/O modules 132 (n≥1). Thus, each critical I/O module 104 is supported with at least one redundant I/O module 132 for protection against I/O failures. The non-critical I/O modules 108, on the other hand, are provided with no redundancy. By providing only a subset of the I/O modules with redundancy, the overall size and cost of the system 100 can be reduced, and/or the number of I/O modules in the system 100 can be increased.

During operation, a fault condition may occur due to the failure of one or more I/O modules 104, 108, thereby disrupting a process control operation. The fault condition may be detected by the fault detection circuit 140, which can send a message identifying the fault to the CPU 112 over the connection 136. Upon detection of the fault condition, each failed I/O module 104, 108 can be isolated by disconnecting the failed I/O module from its associated sensor or actuator. If the failed I/O module is a critical module 104, the CPU 112 can also send a redundancy command to cause a redundant I/O module 132 to take over the I/O functionality of the failed critical I/O module 104. In this way, the failure of a critical I/O module 104 can be quickly remedied, reducing or minimizing disruptions to the process control operation.

While FIG. 1 has been described as supporting the use of redundant I/O modules, other approaches could also be used. For instance, redundant I/O channels could be provided for critical I/O channels. An example of this is shown in FIG. 2, where primary I/O modules 204 and 208 can be connected to the CPU 112 and to the sensors 116 and actuators 120. The primary I/O modules represent the primary paths through which data is transferred between external components. One or more secondary I/O modules 212 are also present and can provide redundant I/O channels for a subset of the channels provided by the primary I/O modules.

In this example, each of the I/O modules 204-212 here supports 32 I/O channels (although any number of I/O channels could be supported by each module). Each primary I/O module 204, 208 provides both critical I/O channels and non-critical I/O channels. For example, the first sixteen channels of each primary I/O module 204, 208 may be dedicated to critical process controls. The second sixteen channels of each primary I/O module 204, 208 may be dedicated to non-critical process controls. The secondary I/O module 212 therefore provides redundant I/O channels for the sixteen critical channels in each primary I/O module 204, 208.

As shown in FIG. 2, the primary I/O module 204 connects the first sixteen channels of a bus connection 220 to a bus connection 224 having sixteen channels. The primary I/O module 204 also connects the second sixteen channels of the bus connection 220 to a bus connection 228 having sixteen channels. Similarly, the primary I/O module 208 connects the first sixteen channels of a bus connection 232 to a bus connection 236 having sixteen channels. The primary I/O module 208 also connects the second sixteen channels of the bus connection 232 to a bus connection 240 having sixteen channels. Each bus connection 220, 232 receives a portion of the channels from the bus connection 124. Similarly, each bus connection 224, 228, 236, 240 receives a portion of the channels from the bus connection 128.

The secondary I/O module 212 here is utilized to provide partial redundancy to the primary modules 204, 208. The secondary I/O module 212 connects the first sixteen channels of the bus connection 220 to a bus connection 244, thereby bypassing the primary I/O module 204. Similarly, the secondary I/O module 212 connects the first sixteen channels of the bus connection 232 to a bus connection 248, thereby bypassing the primary I/O module 208. Thus, the secondary I/O module 212 provides partial redundancy to the critical I/O channels of the primary I/O modules 204, 208 by providing failure protection to only those channels dedicated to critical process controls. The system may provide 1:n redundancy for the critical I/O channels, where each critical I/O channel has n redundant I/O channels (n≥1).

If a fault condition occurs (such as one or more channels of a primary I/O module fail), the fault detection circuit 140 can detect the fault condition and identify the malfunctioning channel(s). In response, the failed channels may be disconnected from sensors or actuators. If one or more failed channels are dedicated to critical processes, the CPU 112 may instruct the secondary I/O module 212 to take over the I/O functions of the failed channel(s).

Note in FIG. 2 that the secondary I/O module is connected to channels in multiple primary I/O modules. In this way, the secondary I/O module can provide redundancy to any number of channels in any number of primary I/O modules. As described in FIG. 1, however, a redundant I/O module could also provide redundancy for an entire critical I/O module. That could be achieved in FIG. 2, for instance, by coupling the bus connection 248 to the channels of the bus connection 228. In this configuration, the secondary I/O module 212 would act as a redundant module for the primary I/O module 204. In either case, redundant I/O channels are provided for critical I/O channels, and the connections to and from a secondary I/O module control whether the secondary I/O module provides redundancy for channels in one or multiple primary I/O modules.

Although FIGS. 1 and 2 illustrate examples of process control systems supporting partial redundancy of I/O modules or channels, various changes may be made to FIGS. 1 and 2. For example, as noted above, any suitable 1:n redundancy could be used for each I/O module or channel. Also, a process control system could have any suitable percentage of critical I/O modules or channels and is not limited to a design where 50% of the I/O modules or channels are critical (as is shown in FIG. 2). In addition, FIGS. 1 and 2 could each include any suitable number of critical I/O modules or channels, non-critical I/O modules or channels, and redundant I/O modules or channels.

According to this disclosure, cost reductions are achieved using partial redundancy of I/O modules or channels. Consider, for example, a system that includes I/O modules having a total of 64 channels. If partial redundancy is provided to 50%; of the channels, a 25% cost reduction can be achieved (compared to a system where all I/O channels have a redundant channel). According to this disclosure, implementing a 50% partial redundancy in a system having 64 channels results in a 25% cost reduction. It will be appreciated that a greater cost reduction may be achieved by reducing the number of modules or channels with a redundant backup and/or by increasing the number of I/O modules or channels in the system.

It will be appreciated that when partial redundancy is implemented providing redundant I/O modules or channels for only a subset of the total I/O modules or channels, a failure of an I/O module or channel lacking redundancy results in reduced channel availability. According to this disclosure, if a 50% redundancy is implemented in a system having 64 channels, channel availability is reduced by only 0.0007%. Thus, if redundancy is reduced from 100% to 50%, channel availability reduces by only 0.0007%. This illustrates that adequate channel availability can still be provided even though half of the I/O modules or channels lack redundancy.

FIG. 3 illustrates an example method 300 for providing partial redundancy of I/O modules or channels according to this disclosure. The method 300 can be performed, for example, in the system 100 of FIG. 1 using redundancy of I/O modules as shown in FIG. 1 or using redundancy of I/O channels as shown in FIG. 2.

Primary I/O modules or channels are connected to at least one processing device at step 304. This could include, for example, coupling the CPU 112 to various I/O modules 104, 108, 204, 208. One or more of the primary I/O modules or channels are critical I/O modules or channels that are dedicated to one or more critical processes. The primary I/O modules or channels are connected to other devices at step 308. This could include, for example, coupling one or more process sensors 116 and one or more actuators 120 to various I/O modules 104, 108, 204, 208.

One or more redundant I/O modules or channels are connected across one or more critical primary I/O modules or channels at step 312. In some embodiments, this could include coupling a redundant I/O module to the inputs and outputs of an I/O module handling critical traffic, where the I/O channels of the redundant I/O module are connected across the channels of a single primary I/O module. In other embodiments, this could include coupling a redundant I/O channel to the inputs and outputs of an I/O channel handling critical traffic, where the I/O channels of the redundant I/O module are connected across the channels of multiple primary I/O modules.

A fault condition is detected at step 316. A fault condition may be caused by the failure of an entire I/O module or by a partial failure affecting only a subset of the channels in an I/O module. In response, the failed I/O modules or channels are disconnected at step 320. This could include, for example, using switches or other mechanisms to interrupt the communication paths from the failed I/O modules or channels to the CPU 112 and the sensors/actuators.

If any of the failed I/O modules or channels is critical, redundant I/O modules or channels are used in place of the failed I/O modules or channels at step 324. This could include, for example, using switches or other mechanisms to reestablish the communication paths between the CPU 112 and the sensors/actuators using the redundant I/O modules or channels. This could be done, for instance, based on a redundancy command issued by the CPU 112. This could also include using the redundant I/O modules or channels to transport data for critical control applications. In this way, communication can be quickly restored for critical control applications. Other actions could also occur, such as notifying maintenance personnel so that a faulty I/O module can be replaced and communications for non-critical applications can be restored.

Although FIG. 3 illustrates one example of a method 300 for providing partial redundancy of I/O modules or channels, various changes may be made to FIG. 3. For example, while shown as a series of steps, various steps in FIG. 3 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
at least one first input/output (I/O) module comprising multiple first I/O channels, each first I/O channel configured to provide a communication path; and
a second I/O module comprising multiple second I/O channels, wherein each second I/O channel is configured to provide a redundant communication path for one of the first I/O channels;
wherein the apparatus is configured to provide the redundant communication paths for only a subset of the first I/O channels.

2. The apparatus of claim 1, wherein:
the first I/O channels comprise critical I/O channels and non-critical I/O channels; and
the apparatus is configured to provide the redundant communication paths for only the critical I/O channels.

3. The apparatus of claim 1, wherein:
the at least one first I/O module comprises multiple first I/O modules; and
the apparatus is configured to provide the redundant communication paths for only the first I/O channels of a single one of the first I/O modules.

4. The apparatus of claim 1, wherein:
the at least one first I/O module comprises multiple first I/O modules; and
the apparatus is configured to provide the redundant communication paths for the first I/O channels of multiple ones of the first I/O modules.

5. The apparatus of claim 1, further comprising:
a fault detection circuit configured to detect a fault condition with at least one of: the at least one first I/O module and the first I/O channels.

6. The apparatus of claim 1, wherein:
the at least one first I/O module is configured to be coupled to multiple bus connectors; and
the second I/O module is configured to be coupled to the multiple bus connectors in parallel with the at least one first I/O module.

7. A system comprising:
at least one processing device configured to communicate over multiple communication paths;
at least one first input/output (I/O) module comprising multiple first I/O channels, each first I/O channel configured to provide one of the communication paths;
a second I/O module comprising multiple second I/O channels, wherein each second I/O channel is configured to provide a redundant communication path for one of the first I/O channels; and
one or more fault detection circuits configured to detect a fault condition with at least one of: the at least one first I/O module and the first I/O channels;
wherein the system is configured to provide the redundant communication paths for only a subset of the first I/O channels.

8. The system of claim 7, wherein:
the first I/O channels comprise critical I/O channels and non-critical I/O channels; and
the system is configured to provide the redundant communication paths for only the critical I/O channels.

9. The system of claim 7, wherein:
the at least one first I/O module comprises multiple first I/O modules; and
the system is configured to provide the redundant communication paths for only the first I/O channels of a single one of the first I/O modules.

10. The system of claim 7, wherein:
the at least one first I/O module comprises multiple first I/O modules; and
the system is configured to provide the redundant communication paths for the first I/O channels of multiple ones of the first I/O modules.

11. The system of claim 7, wherein:
the one or more fault detection circuits are further configured to notify the at least one processing device of the fault condition; and
the at least one processing device is further configured to isolate the first I/O module or the first I/O channel associated with the fault condition.

12. The system of claim 7, wherein:
the at least one first I/O module is configured to be coupled to multiple parallel bus connectors; and
the second I/O module is configured to be coupled to the multiple parallel bus connectors in parallel with the at least one first I/O module.

13. The system of claim 7, further comprising:
one or more sensors configured to provide sensor measurements to the at least one processing device over one or more of the communication paths; and
one or more actuators configured to receive control signals from the at least one processing device over one or more other of the communication paths.

14. The system of claim 13, wherein:
the first I/O channels comprise critical I/O channels and non-critical I/O channels; and
the critical I/O channels are associated with at least one critical control application executed by the at least one processing device.

15. A method comprising:
obtaining at least one first input/output (I/O) module comprising multiple first I/O channels, each first I/O channel configured to provide a communication path; and
creating redundant communication paths using a second I/O module comprising multiple second I/O channels, wherein each second I/O channel is configured to provide one of the redundant communication paths for one of the first I/O channels;
wherein the redundant communication paths are provided for only a subset of the first I/O channels.

16. The method of claim 15, wherein:
the first I/O channels comprise critical I/O channels and non-critical I/O channels; and
the redundant communication paths are provided for only the critical I/O channels.

17. The method of claim 15, wherein:
the at least one first I/O module comprises multiple first I/O modules; and
the redundant communication paths are provided for only the first I/O channels of a single one of the first I/O modules.

18. The method of claim 15, wherein:
the at least one first I/O module comprises multiple first I/O modules; and
the redundant communication paths are provided for the first I/O channels of multiple ones of the first I/O modules.

19. The method of claim 15, further comprising:
detecting a fault condition with at least one of: the at least one first I/O module and the first I/O channels.

20. The method of claim 15, wherein:
the at least one first I/O module is coupled to multiple bus connections; and
the second I/O module is coupled to the multiple bus connections in parallel with the at least one first I/O module.

* * * * *